Figures 4, 5:
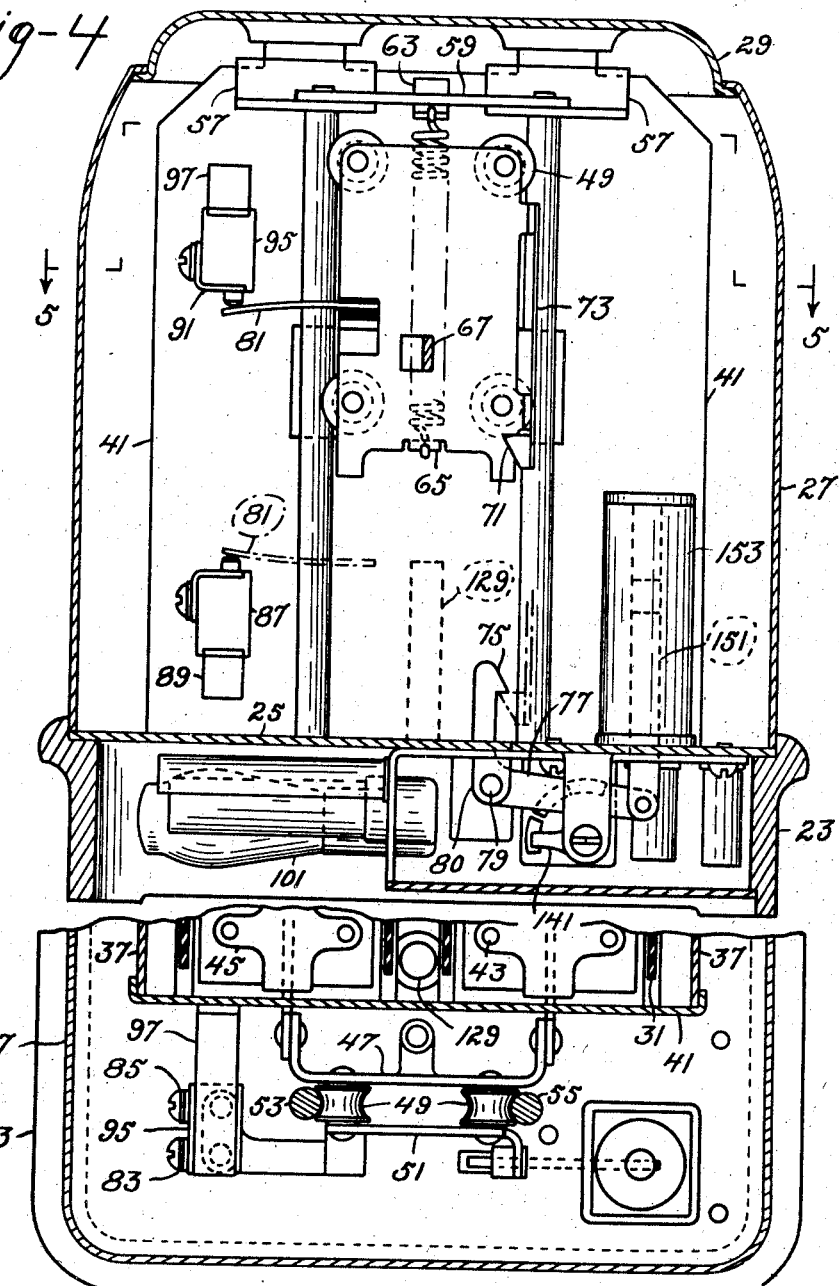

Nov. 18, 1947.  B. G. OLVING  2,431,195
AUTOMATIC ELECTRIC TOASTER
Filed Oct. 9, 1944  3 Sheets-Sheet 1
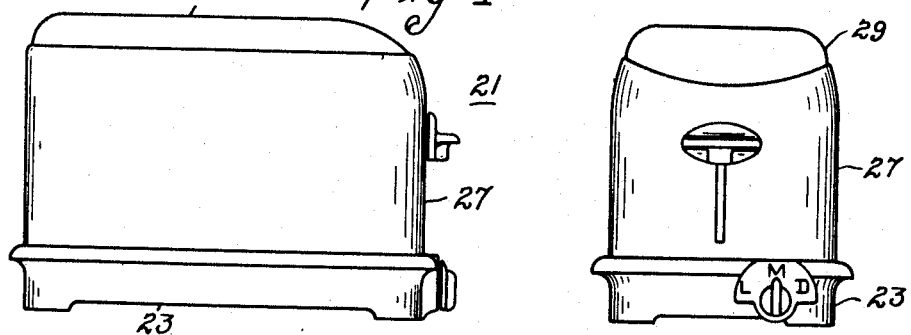
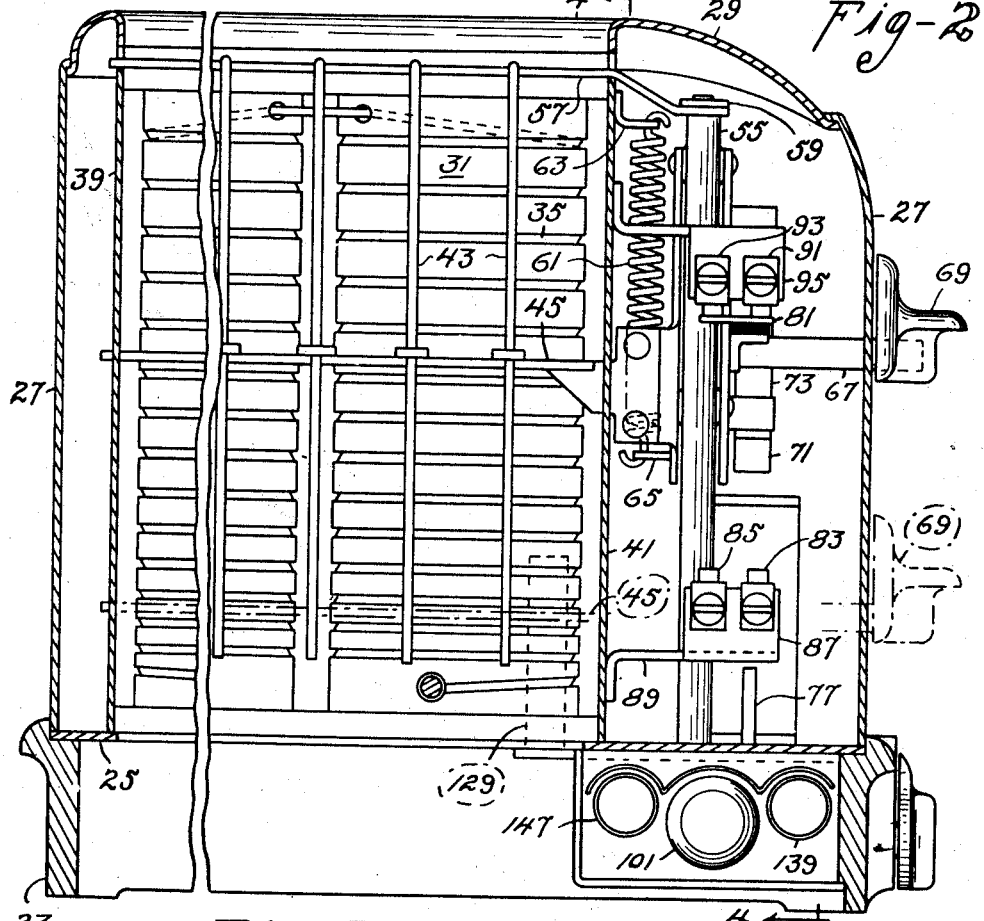
INVENTOR.
BROR G. OLVING
BY H. M. Bielel
Atty Nov. 18, 1947.   B. G. OLVING   2,431,195
AUTOMATIC ELECTRIC TOASTER
Filed Oct. 9, 1944   3 Sheets-Sheet 2

INVENTOR.
BROR G. OLVING
BY
H. M. Bielel
Atty

Nov. 18, 1947.   B. G. OLVING   2,431,195
AUTOMATIC ELECTRIC TOASTER
Filed Oct. 9, 1944   3 Sheets-Sheet 3

INVENTOR.
BROR G. OLVING
BY
H. M. Bickel
Att'y

Patented Nov. 18, 1947

2,431,195

UNITED STATES PATENT OFFICE 2,431,195

AUTOMATIC ELECTRIC TOASTER

Bror G. Olving, Elgin, Ill., assignor to McGraw Electric Company, Elgin, Ill., a corporation of Delaware Application October 9, 1944, Serial No. 557,900

7 Claims. (Cl. 99—327)

My invention relates to automatic electric toasters, and particularly to means for timing the duration of a toasting operation.

An object of my invention is to provide a timing means and an electric circuit therefor, which are dependable and will stand up for long periods of service.

Another object of my invention is to provide a timing means, the performance of which depends upon the inherent electrical characteristics of its component parts and the operation of which is not dependent on or controlled by energy supplied from mechanical or thermal storage devices.

Another object of my invention is to provide an electric timing means and an electric circuit therefor, including an electron tube, to obtain the above mentioned performance.

Another object of my invention is to provide a timing circuit, including an electron tube and means for varying the duration of a toasting operation to compensate for temperature changes of the toaster structure, different circuit voltages, and to permit of obtaining different degrees of toasting desired by the user.

In the drawings,

Figure 1 is a view, in side elevation, of a toaster, having operatively associated therewith a system embodying my invention, Fig. 2 is a front view of the toaster, Figs. 1 and 2 being on a reduced scale.

Figure 6:
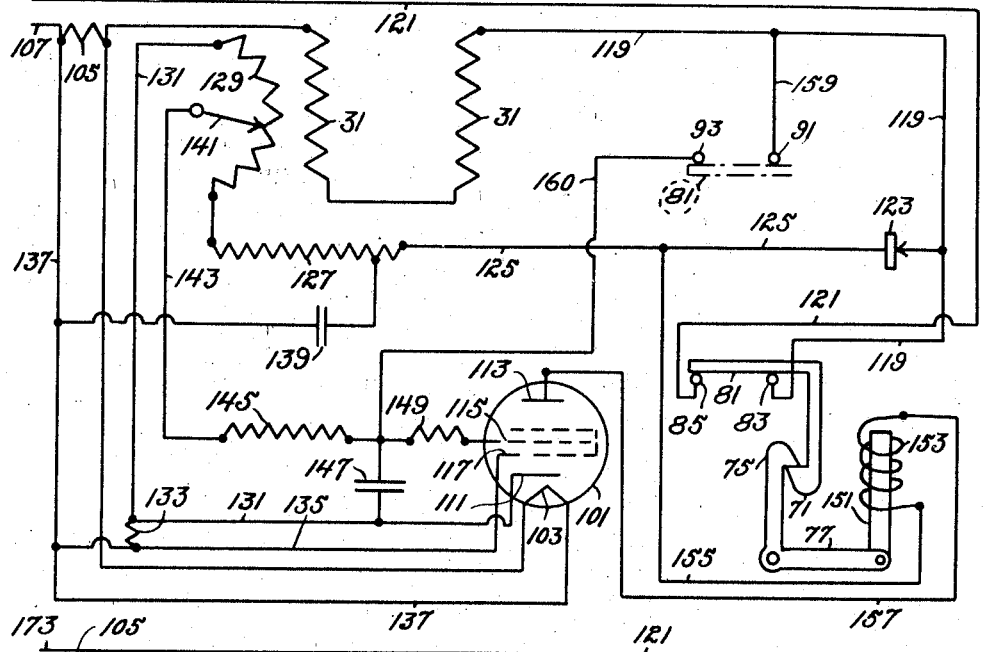
Figure 7:
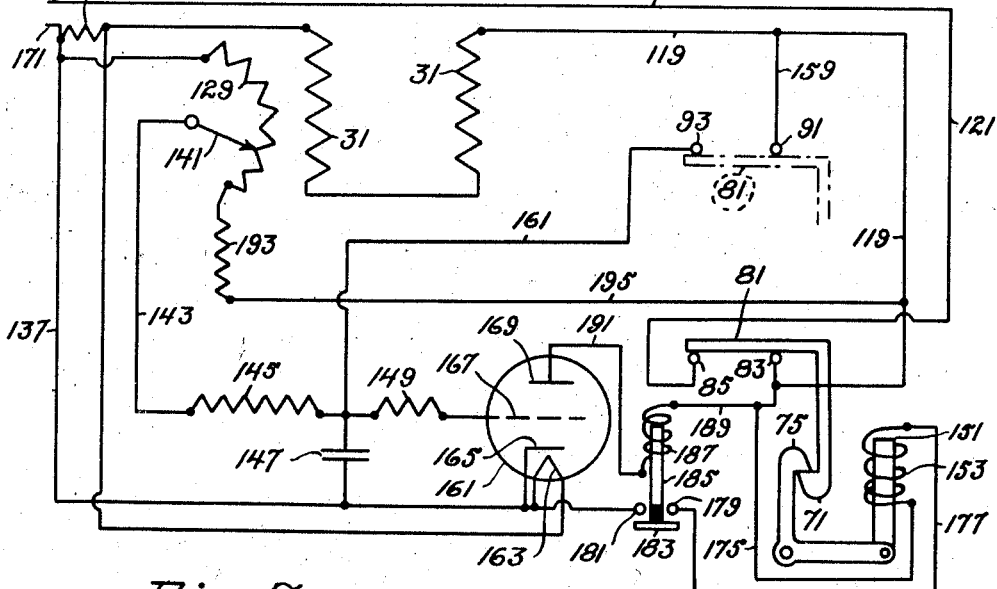

Fig. 3 is a vertical, sectional view through a toaster having associated therewith a timing circuit embodying my invention, Fig. 4 is a vertical, lateral, sectional view therethrough, taken on the line 4—4 of Fig. 3, Fig. 5 is a fragmentary, horizontal, sectional view, taken on the line 5—5 of Fig. 4, Fig. 6 is a diagram of connections embodying my invention, and, Fig. 7 is another diagram of connections embodying my invention.

Referring first to Figs. 1 to 5 inclusive, I have there illustrated a standard automatic two-slice electric toaster, designated generally by the numeral 21 and comprising a bottom frame member 23, which may be made of pressed composite material and which supports at its upper end a bottom plate 25 and an outer casing 27 thereon. The casing is provided with an interfitting cover member 29, and I have elected to show a two-slice toaster such as is now on the market.

I provide two pairs of vertical, planar heating elements designated generally by the numeral 31, each of said heating elements comprising one or more sheets 33 of electric-insulating material, such as mica, on which is wound a strip 35 of a suitable resistance material. Each pair of the planar heating elements 31 is positioned in a toasting chamber, of which one of said elements constitutes one side, while a baffle plate 37 constitutes the other side. An intermediate rear wall 39 and a front intermediate wall 41 are also provided, and these walls and baffle plates are supported and held in desired proper operative positions by any means now well known in the art. I provide also a plurality of vertically extending guard and guide wires 43, which are also supported in any manner now well known in the art and serve to prevent lateral movement of a slice of bread being toasted in a toasting chamber and engagement thereof with the resistor 35.

I provide also a pair of bread carriers 45, one in each of the toasting chambers, the rear end portions of which extend through vertical slots in the rear intermediate wall 39, while the front end portions extend through vertical slots in the front intermediate wall 41. The front end portions of carriers 45 are secured to a rear carriage plate 47, which is of substantially rectangular shape and has rotatably mounted thereon four grooved rollers 49 at or adjacent to the respective corners thereof. A front carriage plate 51 is also provided, and the rollers are positioned between the front and the rear carriage plates. The pairs of rollers are adapted to engage vertical standards or rods 53 and 55, the lower ends of which are fixedly secured in plate 25, while the upper ends are secured in the front end portions of top frame plates 57 extending from front to rear above the respective toasting chambers.

The front portions of the frame plates 57 are secured together by a cross bar 59. A tension coil spring 61 has its upper end secured to a small bracket 63 mounted on front intermediate wall 41, while its lower end is secured to a rearwardly extending lug 65 forming a part of the rear carriage plate 47. Spring 61 biases the bread carriers into their upper or non-toasting position, from which they may be moved by any suitable means into their lowered or toasting positions shown by the broken lines in Fig. 3.

The front carriage plate 51 has mounted thereon a forwardly extending bar 67 which projects outwardly through a vertical slot in the front wall of the outer casing 27 and has an actuating knob 69 mounted thereon, by means of which an operator can move the carriers downwardly against the tension of the biasing spring 61 until the carriers are positioned in their lowermost or toasting position. The position shown in full lines in Fig. 3 is the upper or non-toasting position.

Means for holding the carriers in their lowermost or toasting position includes a hook 71 mounted on the lower end of a resilient bar 73 which is secured at its upper end to the front carriage plate 51. When the bread carriers are moved downwardly, lug 71 is adapted to engage with the hook end 75 of a latch comprising a bell crank lever 77 pivotally mounted on a pin or stub shaft 79 pivotally supported as by a bracket 80 below the bottom plate 25. Energization of the toast heating elements 31 is controlled by a resilient contact bridging member 81 insulatedly supported by the front carriage plate 51. A pair of fixed contacts 83 and 85 are supported on a block 87 of electric-insulating material which is supported by a bracket 89 from the front intermediate wall 41. When the carriers are moved into their lowermost or toasting position, contact bridging member 81 will engage the two fixed contacts 83 and 85 to cause energization of the four electric toast heating elements.

I provide also an additional pair of contact members 91 and 93 which are supported on a block 95 of electric-insulating material which is supported by a bracket 97 secured to the front intermediate wall 41 adjacent to the upper end portion thereof, so that they will be engaged by contact bridging member 81 when it has been moved together with the carriers into the upper non-toasting positions of the latter. The purpose of these two upper additional contacts will hereinafter appear.

While I have illustrated and described in Figs. 1 to 5 inclusive specific embodiments of a standard domestic type of automatic electric toaster, I do not desire to be limited thereto, since all of these elements are old and well known in the art and constitute no part of my present invention, which will now be described.

Referring now to Fig. 6 of the drawings, I have there shown a circuit embodying my invention and including an electron tube 101. This tube includes a heating filament 103 which is adapted to be energized by a small resistor 105 connected in series with one supply circuit conductor 107 and the toast heating elements 31. The tube 101 includes an indirectly heated cathode 111, a plate or anode 113, as well as a grid 115, and a screen grid 117. Electron tubes of this type and kind are well known in the art.

The inner terminal of the small resistor 105 is connected to one terminal of the toast heating elements 31, while the other terminal of the other toast heating element 31 is connected by a conductor 119 to the lower fixed contact 83. The other fixed contact 85 is connected by a conductor 121 to the other supply circuit conductor 109, the two supply circuit conductors being adapted to be connected to an alternating current source of supply. A half wave dry type rectifier 123 has one of its terminals connected to conductor 119, while its other terminal is connected by a conductor 125 with one terminal of a resistor 127, the other terminal of which is connected to one terminal of a potentiometer 129, the other terminal of which is connected by a conductor 131 to one terminal of a small resistor 133, the other terminal of which is connected to a conductor 135. Conductor 135 has one end connected to a conductor 137 extending from one terminal of resistor 105 to one terminal of the heating filament 103, while the other end thereof is connected to screen grid 117.

Resistor 133 is a grid bias resistor. Resistor 127 has a zero temperature coefficient of resistance, that is its resistance does not change appreciably with change of temperature and is preferably located in the bottom portion of the toaster, so that its ohmic resistance, which may be on the order of 3000 ohms, will not change appreciably. The ohmic resistance of the potentiometer 129 when cold, may be on the order of 300 ohms and that of the grid bias resistor 133 may be 100 ohms.

A filter condenser 139 has one terminal thereof connected to a tap on resistor 127, while its other terminal is connected to conductor 137. The capacitance of the filter condenser 139 may be on the order of one-half microfarad. The minor portion of resistor 127, the ohmic resistance of which may be on the order of 100 ohms, serves the purpose of limiting the filter condenser charging current through rectifier 123 to a safe value at the instant of closing the main switch, including the contacts 83 and 85 and bridging member 81. The filter or ballast condenser 139 serves the purpose of smoothing out the ripples of the rectified voltage wave and of absorbing random surges of the voltage supply in order to improve the accuracy and reliability of the timing operation. The potentiometer 129 has a manually-adjustable contact arm 141, the fixed terminal of which is connected by a conductor 143 to one terminal of a timing resistor 145, the other terminal of which is connected to one terminal of a timing condenser 147, the other terminal of which is connected to conductor 131. The junction of the timing resistor 145 and of the timing condenser 147 is connected to one terminal of a resistor 149, the other terminal of which is connected to grid 115. The resistor 149 has a value on the order of 25,000 ohms in order to limit the discharging current of the condenser 147 through the tube 101, and the capacitance of condenser 147 may be on the order of 5 microfarads.

As has already been hereinbefore stated, when the carriers are moved downwardly into toasting position, hook member 71 will engage member 75 of a latch, which includes a magnetizable armature core 151 adapted to be energized by a coil 153. One terminal of coil 153 is connected by a conductor 155 to conductor 125, while the other terminal of coil 153 is connected by a conductor 157 with anode 113 of tube 101. The ohmic resistance of the timing resistor 145 is on the order of 10 megohms. The magnitude of the charging voltage to the timing circuit comprising the timing resistor 145 and the timing condenser 147 and therefore the length of time required to charge the timing condenser 147 to its "firing" potential is dependent upon the portion of potentiometer 129 connected in circuit by contact arm 141 connected to timing resistor 145, and also upon its temperature. Upon energization of the circuit at the start of a toasting operation the rectified half waves of direct current potential provided by rectifier 123 will be applied to condenser 147 through the timing resistor 145, and the action of charging the condenser 147 is analogous to the charging of a secondary or storage battery, that is the potential at the terminal of condenser 147 will be increased gradually and, when starting with a cold toaster, it will require a length of time on the order of two and one-half to three minutes until the potential across the terminals of condenser 147 has reached a value sufficient to fire the tube 101 or to make the initially non-conductive tube become conducting. This voltage of the timing condenser 147 necessary to fire the tube 101 may be on the order of 25 volts. The circuit traversed by the current traversing tube 101 may be traced as follows: from supply circuit conductor 109 through conductor 121 to the main heater control switch, including contacts 85 and 83 and bridging member 81, through a conductor 119, through rectifier 123, through conductors 125 and 155, coil 153, through conductor 157, through tube 101, and from there through conductor 131, resistor 133, and conductors 135 and 137 to the second supply circuit conductor 107. The energized coil 153 causes quick upward movement of core 151 with resultant disengagement of latch member 75 from hook member 71 and quick upward movement of the bread carriers into non-toasting position with attendant engagement of bridging member 81 with the upper fixed contacts 91 and 93.

The bridging member 81, which is in engagement with the upper fixed contacts 91 and 93 during non-operating positions of the parts of the toaster, provides a discharge circuit for condenser 147 as follows: contact 91 is connected to conductor 119 by a conductor 159, while contact 93 is connected by a conductor 160 to the junction of terminals of the timing resistor 145 and of the timing condenser 147. The circuit through which condenser 147 discharges is substantially as follows: from the upper terminal of condenser 147 through conductor 160 to contact 93, through bridging member 81 to contact member 91, conductor 159 and conductor 119, through toast heating elements 31, through resistor 105, conductor 137, a part of conductor 135, through grid bias resistor 133, and then through conductor 131 to the other terminal of condenser 147.

The resistor of potentiometer 129 has a positive temperature coefficient of resistance, so that upon quickly successive toasting operations, the temperature increase of potentiometer 129 will cause an increase in the value of the ohmic resistance, so that, with a fixed position of contact arm 141, the voltage applied to the condenser 147 will increase, with the result that the charging of condenser 147 to a firing voltage is reduced, so that substantially the same degree of toasting will be obtained, irrespective of the temperature of the toaster structure. It is only necessary to properly correlate the cold resistance of the potentiometer 129, that of the timing resistor 145, as well as the coefficient of resistance of potentiometer 129, to obtain the desired result of substantially the same degree of toasting of successive slices of bread, irrespective of variations of the temperature of the toaster.

In order to obtain different degrees of toasting of successive slices of bread, it is only necessary to manually adjust the position of contact arm 141 of the potentiometer 129 in order to vary the degree of toasting, from light, to medium, or to dark. If contact arm 141 is moved in a counter-clockwise direction, the potential impressed upon the timing condenser 147 through the timing resistor 145 will be decreased, and therefore the duration of a toasting operation will be increased, with the result that instead of light toast, medium toast, or even dark toast will be obtained.

Referring now to Fig. 7 of the drawings, I have there shown another circuit which is adapted to be energized from a direct current source of supply. A gas triode tube 161 has a heating filament 163 which is adapted to be connected to and energized by a small resistor 105. An indirectly heated cathode 165 is part of tube 161, which includes also a grid 167 and a plate anode 169. I provide a pair of supply circuit conductors 171 and 173, of which 171 is connected to resistor 105, the other terminal thereof being connected to toast heating elements 31. The other terminal of toast heating elements 31 is connected by conductor 119 to terminal 83 of the main switch and by conductor 175 to one terminal of coil 153 of the electromagnetic latch release means. The other terminal of coil 153 is connected by conductor 177 to one terminal 179 of a second or auxiliary electromagnetic relay. The second fixed contact terminal 181 of this relay is connected to conductor 137. A contact bridging member 183 is supported by an armature core 185, which is adapted to be energized by a coil 187. One terminal of coil 187 is connected by a conductor 189 to conductor 175 and therefore to contact 83, while the other terminal of coil 187 is connected by a conductor 191 to plate anode 169.

I provide a potentiometer 129, one terminal of which is connected to conductor 137, while the other terminal thereof is connected to a resistance 193, the other terminal of which is connected by a conductor 195 to conductor 119. The value of the ohmic resistance of potentiometer 129, when cold, is on the order of 2000 ohms. The resistor material of potentiometer 129 has a positive temperature coefficient of resistance and it is subject to heat from the toast heating elements. The coefficient of resistance of potentiometer 129 is such that its resistance, when hot, is on the order of 5000 ohms. The ohmic resistance of resistor 193, which has a substantially zero temperature coefficient of resistance is on the order of 8000 ohms.

The potentiometer 129 has a manually-adjustable contact arm 141, which is connected by a conductor 143 with a timing resistor 145, the ohmic value of the resistance thereof being on the order of 10 megohms. One terminal of resistor 145 is connected to one terminal of a timing condenser 147, which has a capacitance on the order of 5 microfarads, the other terminal thereof being connected to conductor 137. The junction of one terminal of timing resistor 145 and of the timing condenser 147 is connected to one terminal of a resistor 149, the ohmic value whereof is on the order of 50,000 ohms. Resistor 149 serves to limit the discharge current from condenser 147.

Let it now be assumed that a user desires to toast one or two slices of bread, starting with a cold toaster. After putting in the slice or slices of bread, he will press down on knob 69 to move the carriers into toasting position, so that hook 71 will engage with the hook 75 on the latch to hold the carriers in toasting position, as well as to hold the contact bridging member 81 in engagement with fixed contacts 83 and 85. Charging of the condenser 147 (Fig. 7) will begin through potentiometer 129 and particularly that part thereof included in the circuit by the contact arm 141, the rest of the circuit being constituted by conductor 143, timing resistor 145 and the timing condenser 147, through conductor 137, and from there to the other terminal of potentiometer 129. The value of the ohmic resistance of this charging circuit is such that the time required to charge condenser 147 to a potential which will fire tube 161, will require a length of time on the order of two and one-half to three minutes, depending of course upon the degree of toasting desired. When condenser 147 has been charged to a potential which will cause firing of tube 161, this potential being on the order of 15 volts, the tube will become conducting, with the result of current flowing through the tube through a circuit traceable as follows: from supply circuit conductor 173 through conductor 121, through the closed main switch comprising contacts 85, 83, and bridging member 81, through conductor 189, coil 187, conductor 191, tube 161 to cathode 165, and from there through conductor 137 to the other supply circuit conductor 171. This causes energizing of coil 187, with the result of causing engagement of contact bridging member 183 with fixed contacts 179 and 181, whereby an energizing circuit is closed through coil 153 of the main or latch releasing means, traceable as follows: from supply circuit conductor 173 through conductor 121, through closed main switch comprising contacts 85, 83 and bridging member 81, through conductor 175, coil 153, through conductor 177, the engaged contacts 179 and 181 with contact bridging member 183, and from there through conductor 137 to the second supply circuit conductor 171. The energized coil 153 causes raising of the core 151 and attendant release of hook member 71 from hook 75 and quick upward movement of the bread carriers into non-toasting position.

Condenser 147 will be discharged after termination of a toasting operation by means of contact bridging member 81 in engagement with fixed contacts 91 and 93 through the toast heating elements 31 by a circuit traceable as follows: from the upper terminal of condenser 147, through conductor 161, through engaged contacts 93 and 91 with bridging member 81, through conductors 159 and 119, through the toast heating elements 31, then through resistor 105 and through conductor 137 to the other terminal of condenser 147. The fully discharged condenser will therefore start any succeeding operation in substantially the same initial condition as it did for the first operation.

The subjection of the potentiometer 129 to heat from the toast heating elements serves also as a means for compensating for temperature increase of the toaster structure, which temperature increase causes a greater amount of toasting to take effect in a given length of time. The resistance of that part of potentiometer 129 connected in the charging circuit increases with increase of temperature of potentiometer 129, so that a higher potential is impressed upon the timing resistor 145 and on condenser 147, with the result that a shorter period of time is required to charge condenser 147 to a potential equal to that necessary to fire the tube 161. Proper correlation of the resistance of the charging circuit and of the potentiometer will ensure that the desired correlation of the length of time of a toasting operation with the desired degree of toasting will be obtained.

By use of the manually-adjustable contact arm 141 of the potentiometer 129, it is possible to preset the timing circuit to obtain any desired degree of toasting during a toasting operation. Thus if contact arm 141 is turned in a counter-clockwise direction, the charging potential applied to condenser 147 through resistor 145 will be reduced so that it will require a relatively longer time to charge condenser 147 to a potential at which tube 161 will be fired. Conversely, if contact arm 141 is turned in a clockwise direction, the potential applied to condenser 147 through resistor 145 is increased so that the degree of toasting obtained will be lessened because it will require a shorter time to charge condenser 147 to its firing potential.

It is evident therefore that in each of the two timing circuits illustrated in Figs. 6 and 7, I have provided an electron tube having an indirectly heated cathode, one of these tubes being adapted for use on an A. C. circuit, while the other is adapted for use on a D. C. circuit, the normally non-conducting tube being rendered conducting by a timing condenser charged from the supply circuit through a potentiometer having a positive temperature coefficient of resistance and being therefore inherently capable of varying the duration of a toasting operation in accordance with the temperature of the toaster structure, making it shorter with increase of temperature of the toaster structure, and making it longer with decrease of temperature of the structure. The manually-adjustable contact arm also provides a means for presetting the degree of toasting which will be obtained from a toasting operation, irrespective of the temperature of the toasting structure.

Various modifications may be made without departing from the spirit and scope of my invention, and all such modifications clearly coming within the scope of the appended claims shall be considered a part of my invention.

I claim as my invention:

1. In an automatic electric toaster, the combination with a toasting chamber, toast heating elements in said chamber and means for starting a toasting operation, of means for terminating a toasting operation comprising a potentiometer, a timing resistor and a timing condenser adapted to be energized from said potentiometer to cause increase of the potential of said condenser, an electron tube connected to said condenser and adapted to be fired thereby when the potential of said condenser has reached a predetermined value, means energized by the current traversing the tube for terminating a toasting operation, said potentiometer being positioned to receive heat from the heating elements and having a positive temperature coefficient of resistance to cause substantially uniform toasting of successive slices of bread, irrespective of changes of temperature of the toaster and means for causing discharge of the condenser through the toast heating elements at the termination of a toasting operation.

2. In an automatic electric toaster, the combination with a toasting chamber, toast heating elements in said chamber and means for starting a toasting operation, of means for terminating a toasting operation comprising a potentiometer, a timing resistor and a timing condenser adapted to be energized from said potentiometer to cause increase of the potential of said condenser, an electron tube connected to said condenser and adapted to be fired thereby when the potential of said condenser has reached a predetermined value, means energized by the current traversing the tube for terminating a toasting operation, said potentiometer being positioned to receive heat from the heating elements and having a positive temperature coefficient of resistance to cause substantially uniform toasting of successive slices of bread, irrespective of changes of temperature of the toaster and being also manually-adjustable to preset the degree of toasting obtained during a toasting operation and means for causing discharge of the condenser through the toast heating elements at the termination of a toasting operation.

3. In an automatic electric toaster, the combination with a toasting chamber, toast heating elements in said chamber and means for starting a toasting operation, of means for terminating a toasting operation comprising a potentiometer, a timing resistor having a positive temperature coefficient of resistance, located close to the toasting chamber and a timing condenser adapted to be energized from said potentiometer to cause increase of potential of said condenser, an electron tube connected to said condenser and adapted to be fired thereby, means energized by the current traversing the tube for terminating a toasting operation, said potentiometer being manually-adjustable to preset the duration of a toasting operation to obtain a predetermined degree of toasting during said toasting operation and means for causing discharge of the condenser through the toast heating elements at the termination of a toasting operation.

4. In an automatic electric toaster, the combination with a toasting chamber, electric toast heating elements in said chamber, a control switch for said heating elements biased to open position and including a contact bridging member, means to move the switch to closed position to start a toasting operation and a releasable latch to hold said switch in closed position, of means for effecting release of said switch to terminate a toasting operation, comprising a potentiometer subject to heat from said heating elements, a timing resistor and a timing condenser connected to be energized by said potentiometer to increase the potential of said condenser, a hot cathode electron tube connected to said condenser and adapted to be fired thereby at a predetermined voltage, means energized by the current traversing the tube to cause release of the latch and termination of a toasting operation, said potentiometer having a positive temperature coefficient of resistance to cause substantially uniform toasting of successive slices of bread, irrespective of temperature variations in the toaster and means for causing discharge of the timing condenser through the toast heating elements at the termination of a toasting operation.

5. A toaster as set forth in claim 4 in which said potentiometer is manually-adjustable to preset the duration of a toasting operation to thereby predetermine the degree of toasting of a slice of bread.

6. In an automatic electric toaster, the combination with a toasting chamber, electric toast heating elements in said chamber, a control switch for said heating elements normally biased to open position and including a contact bridging member, a bread carrier in said toasting chamber movable into toasting and non-toasting positions relatively to said heating elements and biased to non-toasting position, means to move the switch into closed position and the carrier into toasting position and a releasable latch for holding the switch in closed position and the carrier in toasting position, of means for causing release of said latch comprising a potentiometer subject to heat from said heating elements, a timing resistor and a timing condenser connected to be energized by said potentiometer to gradually increase the potential of said condenser, an electron tube connected to said condenser and adapted to be fired thereby at a predetermined voltage, means energized by the current traversing the tube to cause release of the latch and termination of a toasting operation, said potentiometer having a positive temperature coefficient of resistance to cause substantially uniform toasting of successive slices of bread, irrespective of temperature variations in the toaster and means including said contact bridging member for causing discharge of the timing condenser through the toast heating elements at the termination of a toasting operation.

7. A toaster as set forth in claim 6 in which said potentiometer is manually-adjustable to preset the duration of a toasting operation to thereby predetermine the degree of toasting of a slice of bread.

BROR G. OLVING.

REFERENCES CITED

The following references are of record in the file of this patent:

UNITED STATES PATENTS

| Number | Name | Date |
| --- | --- | --- |
| 2,363,169 | Fischer | Nov. 21, 1944 |
| 2,182,124 | Guerra | Dec. 5, 1939 |
| 2,061,011 | Vingerhoets | Nov. 17, 1936 |
| 2,207,871 | Myers | July 16, 1940 |
| 2,215,404 | Myers | Sept. 17, 1940 |
| 2,317,228 | Shroyer | Apr. 20, 1943 |
| 2,364,998 | Palmer et al. | Dec. 12, 1944 |